US009161167B2

(12) United States Patent
Aldana et al.

(10) Patent No.: US 9,161,167 B2
(45) Date of Patent: Oct. 13, 2015

(54) VISUAL IDENTIFIER OF THIRD PARTY LOCATION

(71) Applicant: QUALCOMM Incorporated, San Diego, CA (US)

(72) Inventors: Carlos Horacio Aldana, Mountain View (CA); Ning Zhang, Saratoga, CA (US); Mary A. Fales, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 13/747,843

(22) Filed: Jan. 23, 2013

(65) Prior Publication Data
US 2014/0206389 A1   Jul. 24, 2014

(51) Int. Cl.
H04W 24/00   (2009.01)
H04W 4/02   (2009.01)
H04W 4/04   (2009.01)
H04L 12/58   (2006.01)

(52) U.S. Cl.
CPC ............... *H04W 4/023* (2013.01); *H04L 51/20* (2013.01); *H04W 4/021* (2013.01); *H04W 4/026* (2013.01); *H04W 4/027* (2013.01); *H04W 4/028* (2013.01); *H04W 4/04* (2013.01); *H04W 4/022* (2013.01)

(58) Field of Classification Search
CPC ..... H04W 4/022; H04W 4/023; H04W 4/028; H04W 4/04; H04W 4/027; H04L 51/20
USPC ........................ 455/456.2, 456.3, 456.1, 456.6
See application file for complete search history.

(56) References Cited

U.S. PATENT DOCUMENTS

| 5,473,369 | A | 12/1995 | Abe |
| 5,951,621 | A | 9/1999 | Palalau et al. |
| 6,532,413 | B1 | 3/2003 | Lee |
| 7,330,112 | B1 * | 2/2008 | Emigh et al. ............. 340/539.13 |
| 7,536,201 | B2 | 5/2009 | Dunko |
| 2004/0109475 | A1 * | 6/2004 | Elam .............................. 370/508 |
| 2008/0036587 | A1 | 2/2008 | Meinzen et al. |
| 2008/0045234 | A1 | 2/2008 | Reed |
| 2009/0167919 | A1 * | 7/2009 | Anttila et al. ............. 348/333.02 |

(Continued)

FOREIGN PATENT DOCUMENTS

JP   2010239568 A   10/2010

OTHER PUBLICATIONS

International Search Report and Written Opinion—PCT/US2014/012545—ISA/EPO—Apr. 24, 2014.

*Primary Examiner* — Khalid Shaheed
(74) *Attorney, Agent, or Firm* — Muncy, Geissler, Olds & Lowe, P.C.

(57) ABSTRACT

Aspects of determining a geographical state of a target through a user device are provided. One method includes identifying at least one target associated with a target device configured to provide position data in a standard reference frame along with corresponding time values, and sending a request for access to geographical state information for at least one target. The method may further include receiving geographical state information associated with the at least one target, and generating a visual identifier of the at least one target based on the geographical state information. The visual identifier may be associated with data captured by an imaging sensor which is functionally coupled to the user device. Systems and apparatuses for determining a geographical state of a target through a user device are further presented.

75 Claims, 7 Drawing Sheets

(56) References Cited

U.S. PATENT DOCUMENTS

| | | |
|---|---|---|
| 2010/0009713 A1 | 1/2010 | Freer |
| 2010/0053324 A1* | 3/2010 | Kim et al. ............... 348/142 |
| 2010/0279712 A1* | 11/2010 | Dicke et al. ............ 455/456.5 |
| 2011/0098056 A1* | 4/2011 | Rhoads et al. ............ 455/456.1 |
| 2012/0179366 A1* | 7/2012 | Tanaka ...................... 701/430 |
| 2013/0102324 A1* | 4/2013 | Qiu et al. ................ 455/456.1 |
| 2013/0150124 A1* | 6/2013 | Kim et al. ................ 455/556.1 |
| 2014/0018094 A1* | 1/2014 | Oren et al. .............. 455/456.1 |
| 2014/0192478 A1* | 7/2014 | Houvener ............... 361/679.41 |

* cited by examiner

VISUAL IDENTIFIER OF THIRD PARTY LOCATION

FIELD OF DISCLOSURE

Aspects of this disclosure generally relate to position determination techniques in wireless communication systems. Specifically, the disclosure provides approaches for integrating position and various imaging sensor data for generating visual identifications of locations of designated targets.

BACKGROUND

Mobile stations have evolved in recent years from simple voice communication devices into powerful mobile computing platforms which can simultaneously collect data from a variety of sources. These mobile stations can combine and processes data from different on-board sensors, transducers, and/or receivers to provide valuable information to the user. In some instances, one or more sensors and/or receivers may provide the mobile station with a capability to determine its position. The ability of mobile stations to accurately determine their position can be useful in the areas of personal productivity, communication, social networking, advertising, e-commerce, and/or other forms of data acquisition. Moreover, the high speed networking capability of these mobile stations can be used in conjunction with their data collection capabilities to offer new mobile applications and services.

In conventional digital cellular networks, position location capability can be provided by various time and/or phase measurement techniques. For example, in CDMA networks, one position determination approach used is Advanced Forward Link Trilateration (AFLT). Using AFLT, a mobile station may compute its position from phase measurements of pilot signals transmitted from a plurality of base stations. Improvements to AFLT have been realized by utilizing hybrid position location techniques, where the mobile station may employ a Satellite Positioning System (SPS) receiver. The SPS receiver may provide position information independent of the information derived from the signals transmitted by the base stations. Moreover, position accuracy can be improved by combining measurements derived from both SPS and AFLT systems using conventional techniques.

In indoor environments where SPS or cellular signals may not be sufficient for accurate position determination, a mobile station may exploit signals from other types of wireless networks, such as Wi-Fi (e.g., IEEE 802.11x standards) or WiMAX (e.g., IEEE 802.16 standards), to derive position information. Conventional position determination techniques used in these other types of wireless networks may utilize range-based position determination techniques. The range-based position determination techniques may estimate distance information using Round Trip Time (RTT) measurements and/or signal strength measurements (e.g., Received Signal Strength Indicator (RSSI)) derived from signals utilized within such networks. The range based position determination may be used for any network device within these networks, such as mobile stations and/or access points (APs) which are placed at unknown positions.

In a variety of mobile applications, users may wish to determine the location of one or more designated targets, which may represent other users, pets, and/or objects of interest, within a predefined group. In some situations, a time history (i.e., tracking a trajectory) of a target may also be desirable. Position information may be determined by mobile stations associated with the designated targets, and subsequently share the position information over a network. Accordingly, such locations of the designated targets may not be visible to a user with the naked eye, but are "known" within the context of the network.

However, conventional approaches for providing position and/or tracking information for one or more targets may be challenging given the limited screen size of mobile stations and the complexity of the information being presented. Conventional approaches may simply overlay the position information of the targets on top of a planar map, which may confuse some users when they attempt to orient the map to their real-world surroundings.

Accordingly, it may be desirable to provide target tracking information to users of mobile stations in a format which is intuitive and can easily allow users to correlate the displayed information to their real-world surroundings.

SUMMARY

Exemplary embodiments of the invention are directed to systems and method for integrating position and various imaging sensor data for generating visual identifications of locations of designated targets.

In one embodiment, a method for determining a geographical state of a target through a user device is provided. The method may include identifying at least one target associated with a target device configured to provide position data in a standard reference frame along with corresponding time values. The method may further include sending a request for access to geographical state information for at least one target, and receiving geographical state information associated with the at least one target. The method may also include generating a visual identifier of the at least one target based on the geographical state information, wherein the visual identifier is associated with data captured by an imaging sensor functionally coupled to the user device.

In another embodiment, a mobile station which generates a visual identification of a location of a target is provided. The mobile station may include a wireless transceiver, a processor coupled to the wireless transceiver, and an imaging sensor functionally coupled to the processor. The mobile station may also include a memory coupled to the processor, wherein the memory stores executable instructions and data. The executable instructions can cause the processor to identify at least one target associated with a target device configured to provide position data in a standard reference frame along with corresponding time values. The processor may further send a request for access to geographical state information for at least one target, and receive geographical state information associated with the at least one target. The processor may further generate a visual identifier of the at least one target based on the geographical state information, wherein the visual identifier is associated with data captured by the imaging sensor.

In yet another embodiment, a method for providing tracking information for a plurality of targets is presented. The method may include receiving position data in a standard reference frame, along with corresponding time values, from a plurality of target devices, and generating three-dimensional geographical state information based on the position data and the corresponding time values. The method may further include receiving a request from a user device for access to the three-dimensional geographical state information for at least one target, and determining access permission of a user associated with the three-dimensional geographical state information of the at least one target. The method may also include providing the three-dimensional geographical state information of the at least one target based on the request.

In another embodiment, a server which provides tracking information for a plurality of targets is provided. The server may include a network interface, a processor coupled to the network interface, and a memory coupled to the processor. The memory stores executable instructions and/or data which can cause the processor to receive position data in a standard reference frame, along with corresponding time values, from a plurality of target devices. The processor may further generate three-dimensional geographical state information based on the position data and the corresponding time values, and receive a request from a user device for access to the three-dimensional geographical state information for at least one target. The processor may also determine access permission of a user associated with the three-dimensional geographical state information of the at least one target, and provide the three-dimensional geographical state information of the at least one target based on the request.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1A:
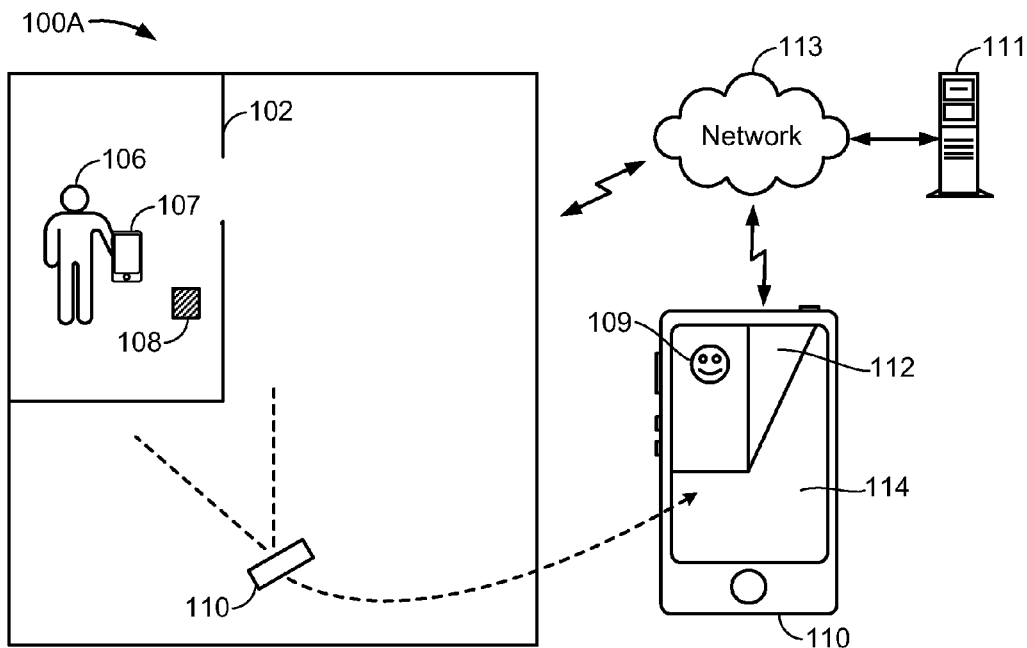
FIGS. 1A and 1B are diagrams of exemplary environments illustrating several embodiments for visually identifying the location of a designated target.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Embodiments are provided in the disclosure for visually identifying the location of a designated target. These embodiments provide the capability for a user to determine position, orientation, and/or other information, (e.g., height, time, velocity, and/or direction of travel), hereinafter referred to as "geographical state information," of a target. As used herein, a "location" of a target refers to the known position of the target in an established reference frame. The target may be a person, animal, or an object (e.g., a car or aircraft) that is associated with a target device. The target device has the ability to determine its geographical state information and communicate this information over a network. The geographical state information of the target can be made readily available to a user through any networked user device (e.g., a laptop, smart phone, etc.) by the presenting some form of visual identifier (e.g. a photograph or avatar) representative of the target on the display of the user device. The appearance of the visual identifier can change depending upon its geographical state information, as will be discussed in more detail below. The visual identifier may be combined with data collected by an imaging sensor, such as an overlay on still image data or "real-time" video data, to allow the user to "see" the visual identifier of the target as it appears in the field of view of the imaging sensor. This permits the user to "scan" an environment by varying the orientation of the user device to search for a designated target. The combination of imaging data being collected in "real-time" and the visual identifier presents an augmented reality on the display of the user device, and allows the user to "see" the target through obstructions (e.g., walls) and/or over large distances.

The position of the target may be collected by exploiting coordinates of the target device, either indoors or outdoors, which can include geodetic coordinates (e.g., latitude, longitude, and height) which are provided with respect to reference and/or a standard coordinate frame (e.g., WGS-84). Once position and/or orientation information is determined for a target device, the information may be collected by another networked processing device such as a server and stored in a database where it may later be accessed by an interested party over a network through a user device. Alternatively, processing can be done by an access point and then sent to a user device, or performed completely by the user device.

Figure 1B:
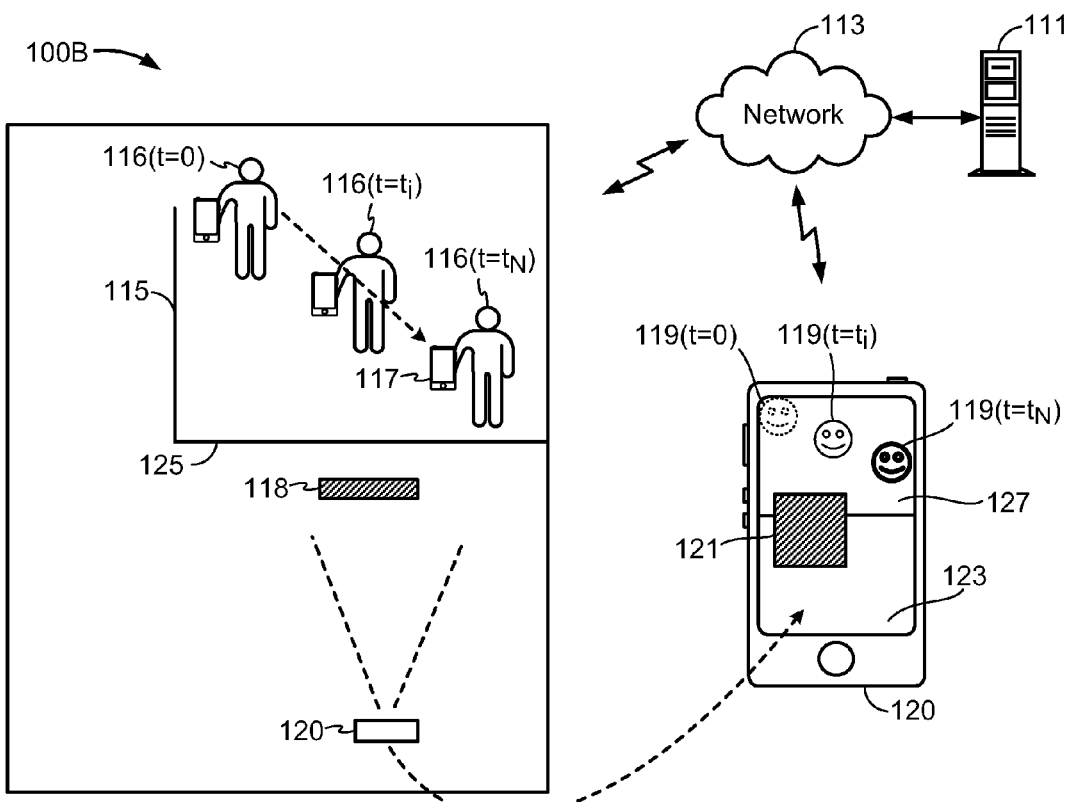

FIGS. 1A and 1B are diagrams of environments 100A and 100B illustrating several embodiments for visually identifying the location of a designated target. Referring to FIG. 1A, a target 106, which may be a person residing in a room 102, is co-located with a target device 107. Typically other objects (e.g., object 108) may also be in the room, but will not typically be associated with the target device 107. The target device 107, which may be a mobile station, can wirelessly provide its location (or in some embodiments, its geographical state information) over the network 113 to a server 111 over a period of time. A user device 110, which may be a mobile station located outside of room 102, can obtain the geographical state of the target device 107 from the server 111 via network 113. The user device 110 may simultaneously collect imaging sensor data (e.g., still image data and/or video) using an on-board imaging sensor aimed in the direction of room 102. Because the user device 110 knows its own position and orientation, it may combine its imaging sensor data with the data corresponding to the geographical state of target device 107. When the user device 110 is oriented in the direction of room 102, the imaging sensor will provide a representation of the imaged scene on its display 114, which may include a representation 112 of the room 102. In the appropriate location on the display 114, within the representation 112 of the room 102, a visual identifier 109 will be displayed to represent the target 106. The visual identifier 109 may be a photograph of the target 106, or a stylized icon such as an avatar. As noted above, the object 108 within the room 102 is not associated with any target device, and thus has no geographical state information stored on the server 111. Accordingly, the object 108 is not represented on the display 114.

FIG. 1B shows an environment 100B where another embodiment can provide a time history for a visual identifier of a target 116. Referring to FIG. 1B, a target 116, which is co-located with a target device 117, may move within a room 115. The movement of the target 116 may be tracked by the target device 117 from time t=0 to t=$t_N$. The target device 117, which may be a mobile station, can wirelessly provide its location as a function of time (i.e., one example of a geographical state) over the network 113 to the server 111. The user device 120, which may be a mobile station located outside of room 115, can obtain the geographical state of the target device 117 from the server 111 via network 113 while simultaneously collecting imaging sensor data using its imaging sensor. As shown in FIG. 1B, the user device 120 is oriented so the imaging sensor's field of view encompasses both object 118 and a facing wall 125 of room 115. Accordingly, the imaging sensor will provide a representation 121 of the object 118 in the display 123, along with a representation 127 of the facing wall 125 of room 115. Additionally, a plurality of visual identifiers 119 will be displayed to represent the target 116 at different times corresponding to the time extent for which it was tracked. Accordingly, visual identifiers 119($t$=0), 119($t$-$t_i$), and 119($t$=$t_N$) will be displayed to represent the target 116($t$=0), 116($t$-$t_i$) and 116($t$=$t_N$), respectively. As before, the visual identifiers may be a photograph of the target 116, or a stylized icon such as an avatar. Moreover, in this case, the visual identifier of each instant in time may be displayed differently. For example, visual identifier 119($t$=0) occurs earliest, so it may displayed in a lighter color than visual identifiers 119($t$=$t_i$) and 119($t$=$t_N$), where 119($t$=$t_N$) may be displayed using the darkest color because it represents the target 116($t$-$t_N$) at the most recent instant in time. Accordingly, the user device can alter the appearance of the visual identifier 119 based upon time and/or upon other states of the target.

Being able to track a target over a period of time may be used to determine where an individual is heading. This may be useful not only when attempting to determine a current location of an individual, but also when the location of the individual cannot be determined (for example, if location services are unavailable or have been turned off). In this case, using a tracked history may be used to extrapolate a target's location. In general, the user device 120 may display a target over a much longer period of time, for example, the display 123 could show a time history of the occasions that the target 116 was located in a designated area. In this aspect, the visual identifiers showing where a target 116 was previously located may change color, size, and/or shape based on the age of the location. In another aspect, the visual identifier 119 may change size, shape, and/or color based on the distance to the user device 120 and/or proximity to a reference. In another aspect, the visual identifier 119 may be interactive, and can provide additional information, such as the time/date of the occurrence, when it is selected by the user, such as tapping the representation (e.g., 119) using a touch screen display. Alternatively, upon interaction with the user, the visual identifier 119 may initiate contact with a person associated with the target device 117, and be used to establish, for example, a text, a voice call, a video conference, and/or initiate a game. Accordingly, the visual identifier 119 may be altered in any manner in order to convey information to the user. For example, the visual identifier may be dynamic and altered as a function of time.

Various types of games may be played using the above described embodiments where at least one target 116 may interact with the user device 120 through playing a game. For example, conducting a game of hide and go seek can be performed in various embodiments. Here, the game may start with no display of targets until a predetermined time expires, a seeker can scan the area to find hidden targets. Hidden targets can view the seeker at all times, and the seeker may display targets within a proximity, upon which users associated with the displayed targets will be provided a notification as being "found." When selecting from a group of targets, a buddy list may be employed wherein targets are selected from a buddy list of third party members a user wishes to display, and includes options to limit which targets may participate and options to display the class of third party targets differently to distinguish among them, or have different alerts when members of the buddy list are discovered and/or displayed.

Moreover, permissions for sharing information regarding a target may be established and stored within server 111. The permissions may be based on the identity of the user and/or the target, and/or a target being in a certain area, room, etc. (for example, "share when in certain store, but not when in another store").

In other embodiments, an alert may be set based on the geographical state information. The alert could be a text message, an email, a call, a pop up message, and/or an audible alert. For example, the user may determine whether to show the visual identifier 119 of a target 116 based upon a pre-set radius of a specified location. For example, the visual indication 119 may remain hidden until the user device 120 is within a threshold radius of the target. The display 123 may only show the visual identifier 119 of the target 116 when it is within the radius. In another aspect, the concept of the radius may be generalized to extend to arbitrary boundaries established by geographic coordinates (e.g., a "geo-fence"). When a target 116 enters/exits an area established by a geo-fence (not shown), a user may be alerted. In another aspect, the geo-fence may designate an area where targets cannot be found by the user device 120.

Exemplary Applications of Visually Locating a Designated Target

The embodiments described above in FIG. 1A and/or FIG. 1B may be useful in a variety of different applications. For example, the position of a target device may be associated with a child and be known or shared with a parent's user device. The parent may sweep user device around, and its display may provide an augmented reality type layover to search for the child beyond the visual proximity of the parent. In this case, the user device may collect still image data and/or video data in real time as the orientation of the user device is changed. On the user device, for example, the face of, distance to, or indicator representing the child may be presented to the parent when the user device is pointing at the location of the child, even if that child is not in the parent's actual line of sight (e.g., the child is on another side of a wall). In another example, when the user is in a shopping mall, the user may sweep the user device around to visually locate where his children are located and/or follow the locations of the children, even if they are in a different portion of the mall. Moreover, the display of the user device may provide directions to a child, for example, in a turn-by-turn manner. A temporal aspect may also be included in the display, allowing the parent to see where the child was over a user selected period of time.

Figure 2:
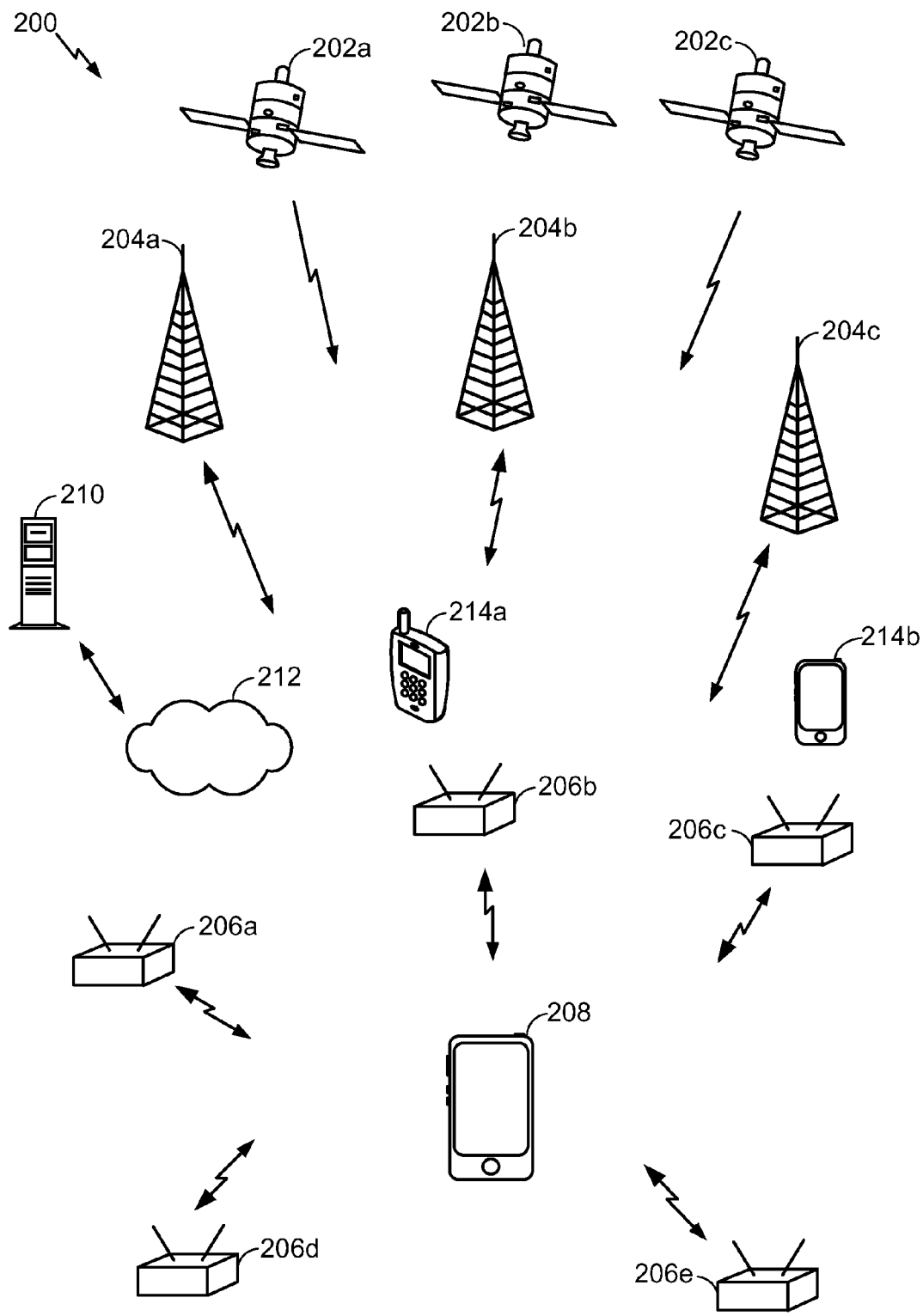
FIG. 2 is a diagram of an exemplary operating environment for a user device that can provide a visual identifier of a target.

FIG. 2 is a diagram of an exemplary operating environment 200 for a user device which may be realized as mobile station 208 that can provide a visual identifier of a target. Embodiments of the disclosure are directed to a mobile station 208 which may utilize a variety of techniques for determining position. The operating environment 200 may contain one or more different types of wireless communication systems and/or wireless positioning systems. In the embodiment shown in FIG. 2, a Satellite Positioning System (SPS) 202a-202c may be used as an independent source of position information for the mobile station 208 and target devices 214a-214b. The mobile station 208 may include one or more dedicated SPS receivers specifically designed to receive signals for deriving geo-location information from the SPS satellites.

The operating environment 200 may also include a plurality of one or more types Wide Area Network Wireless Access Points (WAN-WAPs) 204a-204c, which may be used for wireless voice and/or data communication, and as another source of independent position information for mobile station 208. The WAN-WAPs 204a-204c may be part of wide area wireless network (WWAN), which may include cellular base stations at known locations, and/or other wide area wireless systems, such as, for example, WiMAX (e.g., 802.16). The WWAN may include other known network components which are not shown in FIG. 2 for simplicity. Typically, each WAN-WAPs 204a-204c within the WWAN may operate from fixed positions, and provide network coverage over large metropolitan and/or regional areas.

The operating environment 200 may further include Local Area Network Wireless Access Points (LAN-WAPs) 206a-206e, may be used for wireless voice and/or data communication, as well as another independent source of position data. The LAN-WAPs 206a-206e can be part of a Wireless Local Area Network (WLAN), which may operate in buildings and perform communications over smaller geographic regions than a WWAN. Such LAN-WAPs 206a-206e may be part of, for example, WiFi networks (802.11x), cellular pico-nets and/or femtocells, Bluetooth Networks, etc.

The mobile station 208 and the target devices 214a-214b may derive position information from any one or a combination of the SPS satellites 202a-202c, the WAN-WAPs 204a-204c, and/or the LAN-WAPs 206a-206e. Each of the aforementioned systems can provide an independent estimate of the position for mobile station 208 and target devices 214a-214b using different techniques. In some embodiments, the mobile station may combine the solutions derived from each of the different types of access points to improve the accuracy of the position data.

When deriving position using the SPS satellites 202a-202c, the mobile station may utilize a receiver specifically designed for use with the SPS satellites 202a-202c that extracts position, using conventional techniques, from a plurality of signals transmitted by SPS satellites 202a-202c. The method and apparatus described herein may be used with various satellite positioning systems, which typically include a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example, but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation, or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed embodiments may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

When deriving position from the WWAN, each WAN-WAPs 204a-204c may take the form of base stations within a digital cellular network, and the mobile station 208 and target devices 214a-214b may include a cellular transceiver and processor that can exploit the base station signals to derive position. It should be understood that digital cellular networks may include additional base stations or other resources shown in FIG. 2. While WAN-WAPs 204a-204c may actually be moveable or otherwise capable of being relocated, for illustration purposes it will be assumed that they are essentially arranged in a fixed position.

The mobile station 208 and target devices 214a-214b may perform position determination using known time-of-arrival techniques such as, for example, Advanced Forward Link Trilateration (AFLT). In other embodiments, each WAN-WAP 204a-204c may take the form of WiMax wireless networking base station. In this case, the mobile station 208 may determine its position using time-of-arrival (TOA) techniques from signals provided by the WAN-WAPs 204a-204c. The mobile station 208 and target devices 214a-214b may determine positions either in a standalone mode, or using the assistance of a positioning server 210 and network 212 using TOA techniques, as will be described in more detail below. Note that embodiments of the disclosure include having the mobile station 208 determine position information using WAN-WAPs 204a-204c which are different types. For example, some WAN-WAPs 204a-204c may be cellular base stations, and other WAN-WAPs 204a-204c may be WiMax base stations. In such an operating environment, the mobile station 208 and target devices 214a-214b may be able to exploit the signals from each different type of WAN-WAP 204a-204c, and further combine the derived position solutions to improve accuracy.

When deriving position using the WLAN, the mobile station 208 and target devices 214a-214b may utilize time of arrival techniques with the assistance of the positioning server 210 and the network 212. The positioning server 210 may communicate to the mobile station 208 through the network 212. Network 212 may include a combination of wired and wireless networks which incorporate the LAN-WAPs 206a-206e. In one embodiment, each LAN-WAP 206a-206e may be, for example, a WiFi wireless access point, which is not necessarily set in a fixed position and can change location. The position of each LAN-WAP 206a-206e may be stored in the positioning server 210 in a common coordinate system. In one embodiment, the position of the mobile station 208 and the target devices 214a-214b may be determined by receiving signals from each LAN-WAP 206a-206e. Each signal may be associated with its originating LAN-WAP 206a-206e based upon some form of identifying information that may be included in the received signal (such as, for example, a MAC address). The mobile station 208 and the target devices 214a-214b may then derive the time delays associated with each of the received signals. The mobile station 208 and the target devices 214a-214b may then form a message which can include the time delays and the identifying information of each of the LAN-WAPs 206a-206e, and send the message via network 212 to the positioning server 210. Based upon the received message, the positioning server 210 may then determine a position, using the stored locations of the relevant LAN-WAPs 206a-206e, of the mobile station 208 and the target devices 214a-214b. The positioning server 210 may generate and provide a Location Configuration Information (LCI) message to the mobile station 208 and the target devices 214a-214b that includes a pointer to a position in a local coordinate system. The LCI message may also include other points of interest in relation to the location of the mobile station 208 and the target devices 214a-214b. When computing the position of the mobile station 208 and the target devices 214a-214b, the positioning server 210 may take into account the different delays which can be introduced by elements within the wireless network.

Regardless of how the positions of the target devices 214a-214b are determined, each target device 214a-214b may provide its position, or in some embodiments, its geographic state information over any period of time so that the mobile station 208 (which is the user device in this embodiment) may access and/or track the geographic state information to generate visual indications of the target devices 214a-214b. The positioning server 210 may further store permissions and/or Access Control Lists (ACLs) so that persons associated with target devices 214a-214b may provide permission to be monitored by the mobile station 208. In some embodiments, the positioning server 210 may further derive geographical state information of a target device 214a-214b based on the received positions of the target device 214a-214b over time.

The position determination techniques described herein may be used for various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Figure 3:
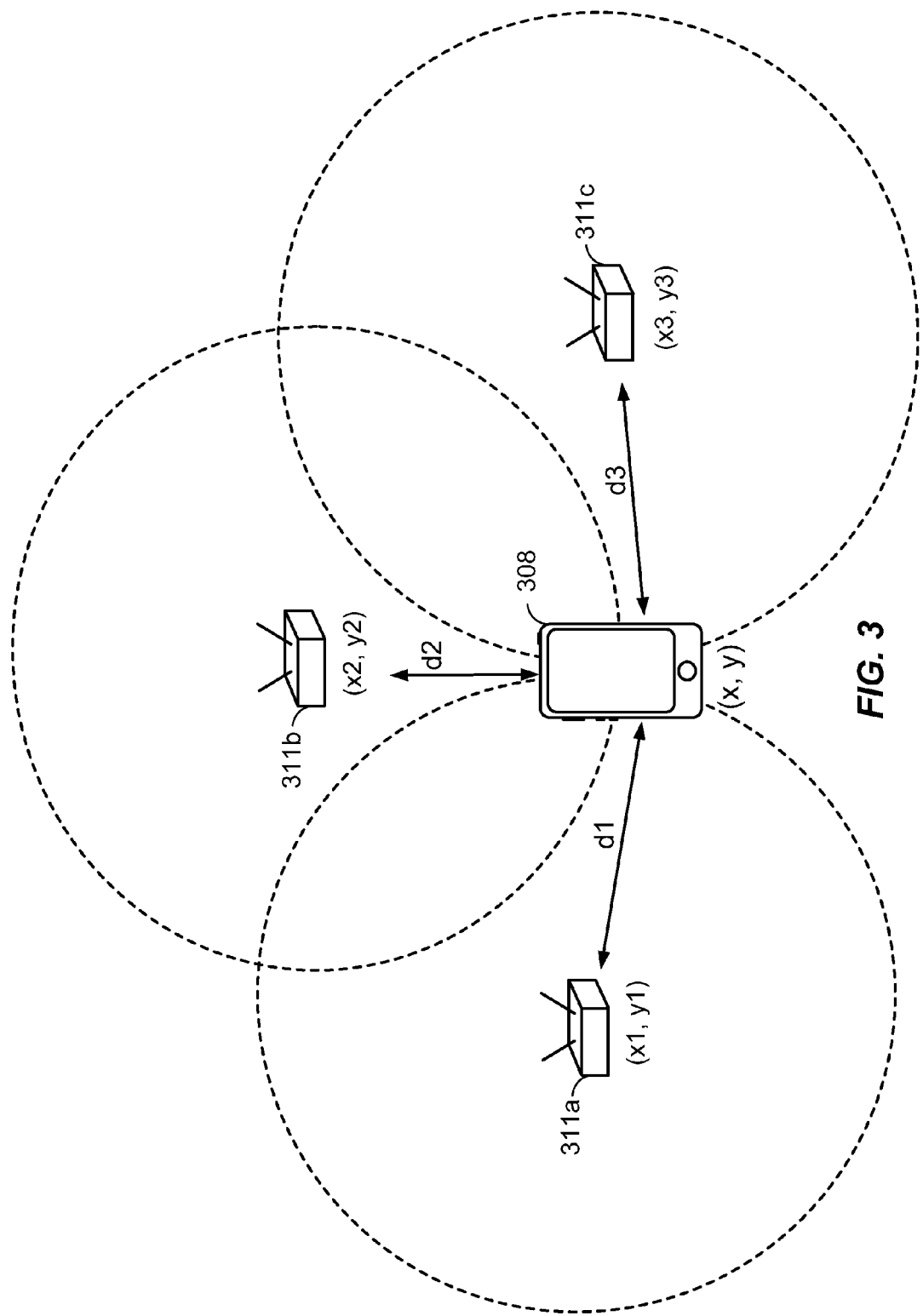
FIG. 3 is a diagram illustrating an exemplary technique for determining a position of a mobile station in a wireless network.

FIG. 3 is a diagram illustrating an exemplary technique for determining a position of mobile station 308 in a wireless network. As shown in FIG. 3, the mobile station 308 may be a user device or a target device. The coordinates for each mobile station 308 may be determined using known techniques associated with wireless networks, such as WiFi, Bluetooth, cellular, etc., that may include using Round Trip Time (RTT) measurements, RSSI measurements, and/or various trilateration techniques. Other wireless positioning techniques employing RFID/NFC positioning schemes, beacons, ranging devices, AFLT or any combination thereof, may also be used.

The mobile station 308 may communicate wirelessly with a plurality of WAPs 311a-311c using RF signals (e.g., 2.4 GHz and/or 5.0 GHz) and standardized protocols for the modulation of the RF signals and the exchanging of information packets (e.g., IEEE 802.11). In FIG. 3, the WAPs 311a-311c may be LAN-WAPs and/or WAN-WAPs. By extracting different types of information from the exchanged signals, and utilizing the layout of the network (i.e., the network geometry) the mobile station 308 may determine its position in a predefined reference coordinate system. As shown in FIG. 3, the mobile station 308 may specify its position (x, y) using a two-dimensional coordinate system; however, embodiments disclosed herein are not so limited, and may also be applicable to determining positions using a three-dimensional coordinate system, if the extra dimension is desired. Additionally, while three WAPS 311a-311c are shown in FIG. 3, embodiments may utilize additional WAPs and solve for position using techniques applicable to over-determined systems, which can average out various errors introduced by different noise effects, and thus improve the accuracy of the determined position.

In order to determine its position (x, y), the mobile station 308 may first need to determine the network geometry. The network geometry can include the positions of each of the WAPs 311a-311c in a reference coordinate system (($x_k$, $y_k$), where k=1, 2, 3). The network geometry may be provided to the mobile station 308 in any manner, such as, for example, providing this information in beacon signals, providing the information using a dedicated server external on an external network, or providing the information using uniform resource identifiers, etc.

The mobile station 308 may then determine a distance ($d_k$, where k=1, 2, 3) to each of the WAPs 311a-311c. There are a number of different approaches for estimating these distances ($d_k$) by exploiting different characteristics of the RF signals exchanged between the mobile station 308 and WAPs 311a-311c. Such characteristics may include, as will be discussed below, the round trip propagation time of the signals (RTT) and/or the strength of the signals (RSSI). These characteristics may be used to determine distances using known techniques.

In other embodiments, the distances ($d_k$) may in part be determined or refined using other sources of information that are not associated with the WAPs. For example, other positioning systems, such as GPS, may be used to provide a rough estimate of $d_k$. Note that it is likely that GPS may have insufficient signal in the anticipated operating environments (indoors, metropolitan, etc.) to provide a consistently accurate estimate of $d_k$. However GPS signals may be combined with other information to assist in the position determination process.

Once each distance is determined, the mobile station 308 can then solve for its position (x, y) by using a variety of known geometric techniques, such as, for example, trilateration. From FIG. 3, it can be seen that the position of the mobile station 308 ideally lays at the intersection of the circles drawn using dotted lines. Each circle being defined by radius $d_k$ and center ($x_k$, $y_k$), where k=1, 2, 3. In practice, the intersection of these circles may not lie at a single point due to the noise and other errors in the networking system.

Figure 4:
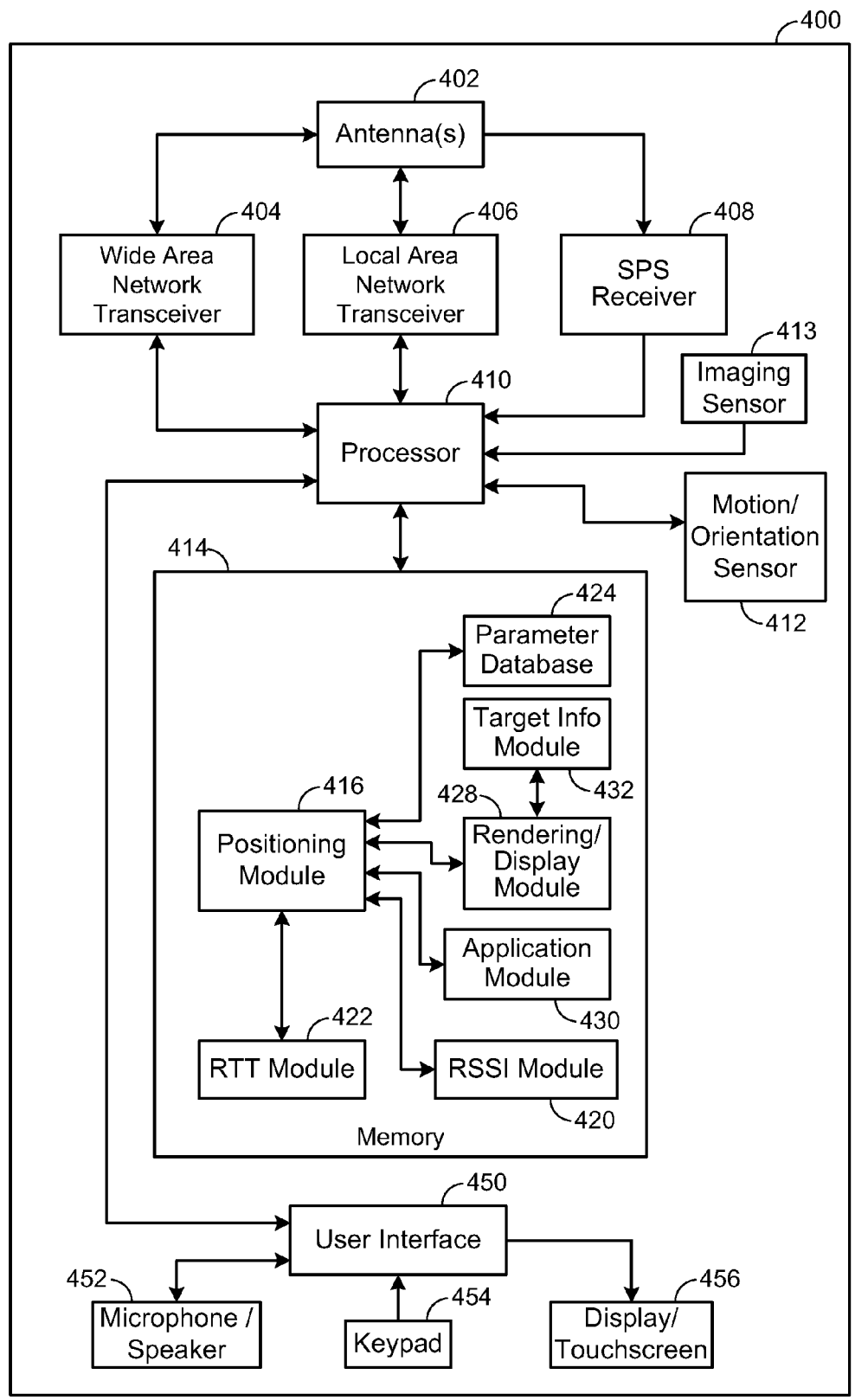
FIG. 4 is a block diagram illustrating various components of an exemplary mobile station.

FIG. 4 is a block diagram illustrating various components of an exemplary mobile station 400. For the sake of simplicity, the various features and functions illustrated in the box diagram of FIG. 4 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Furthermore, it is also recognized that one or more of the features or functions illustrated in the example of FIG. 4 may be further subdivided, or two or more of the features or functions illustrated in FIG. 4 may be combined.

The mobile station 400 may include one or more wide area network transceiver(s) 404 that may be connected to one or more antennas 402. The wide area network transceiver 404 comprises suitable devices, hardware, and/or software for communicating with and/or detecting signals to/from WAN-WAPs 204a-204c, and/or directly with other wireless devices within a network. In one aspect, the wide area network transceiver 404 may comprise a CDMA communication system suitable for communicating with a CDMA network of wireless base stations; however in other aspects, the wireless communication system may comprise another type of cellular telephony network, such as, for example, TDMA or GSM. Additionally, any other type of wireless networking technologies may be used, for example, WiMax (802.16), etc. The mobile station 400 may also include one or more local area network transceivers 406 that may be connected to one or more antennas 402. The local area network transceiver 406 comprises suitable devices, hardware, and/or software for communicating with and/or detecting signals to/from LAN-WAPs 206a-206e, and/or directly with other wireless devices within a network. In one aspect, the local area network transceiver 406 may comprise a WiFi (802.11x) communication system suitable for communicating with one or more local wireless access points; however in other aspects, the local area network transceiver 406 may comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs 206a-206e and/or WAN-WAPs 204a-204c. Specifically, in the description presented below, when the term "WAP" is used, it should be understood that embodiments may include a mobile station 400 that can exploit signals from a plurality of LAN-WAPs 206a-206e, a plurality of WAN-WAPs 204a-204c, or any combination of the two. The specific type of WAP being utilized by the mobile station 400 may depend upon the environment of operation. Moreover, the mobile station 400 may dynamically select between the various types of WAPs in order to arrive at an accurate position solution.

An SPS receiver 408 may also be included in mobile station 400. The SPS receiver 408 may be connected to the one or more antennas 402 for receiving satellite signals. The SPS receiver 408 may comprise any suitable hardware and/or software for receiving and processing SPS signals. The SPS receiver 408 requests information and operations as appropriate from the other systems, and performs the calculations necessary to determine the mobile station's 400 position using measurements obtained by any suitable SPS algorithm.

A motion/orientation sensor 412 may be coupled to processor 410 to provide relative movement and/or orientation information which is independent of motion data derived from signals received by the wide area network transceiver 404, the local area network transceiver 406 and the SPS receiver 408. By way of example but not limitation, motion/orientation sensor 412 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, motion/orientation sensor 412 may include a plurality of different types of devices and combine their outputs in order to provide motion information.

An imaging sensor 413 may be coupled to processor 410 to provide image and/or video data of a field of view associated with the mobile station 400 for combining with visual identifiers for subsequent display as described above. The imaging sensor 413 may be any suitable optical sensor such as a CCD, a CMOS imaging sensor, etc. Alternatively, in some embodiments, an imaging sensor 413 may be physically separate from the user device and functionally coupled over a network.

The processor 410 may exchange data between the wide area network transceiver 404, local area network transceiver 406, the SPS receiver 408, the motion/orientation sensor 412, and/or the imaging sensor 413 for receiving data for processing and/or providing commands for configuration of components for various modes of operation. The processor 410 may include one or more microprocessors, microcontrollers, and/or digital signal processors that provide processing functions, as well as other calculation and control functionality. The processor 410 may also include memory 414 for storing data and software instructions for executing programmed functionality within the mobile station 400. The memory 414 may be on-board the processor 410 (e.g., within the same IC package), and/or the memory may be external memory to the processor 410 and functionally coupled over a data bus. The details of software functionality associated with aspects of the disclosure will be discussed in more detail below.

A number of software modules and data tables may reside in memory 414 and be utilized by the processor 410 in order to manage communications, position determination, and visual identification/display functionality. As illustrated in FIG. 4, memory 414 may include and/or otherwise receive a positioning module 416, an application module 430, a received signal strength indicator (RSSI) module 420, a round trip time (RTT) module 422, a rendering/display module 428, and a target information module 432. One should appreciate that the organization of the memory 414 contents as shown in FIG. 4 is merely exemplary, and as such the functionality of the modules and/or data structures may be combined, separated, and/or be structured in different ways depending upon the implementation of the mobile station 400.

The application module 430 may be a process running on the processor 410 of the mobile device 400, which requests position information from the positioning module 416. Applications typically run within an upper layer of the software architectures, and may include Buddy Locator, Shopping and Coupons, Asset Tracking, and/or various games and applications presented above in the description of FIG. 1. The positioning module 416 may determine the position of the mobile device 400 using information derived from the RTTs measured from signals exchanged with a plurality of WAPs. In order to accurately determine position using RTT techniques, reasonable estimates of processing time delays introduced by each WAP may be used to calibrate/adjust the measured RTTs. The measured RTTs may be determined by the RTT module 422, which can measure the timings of signals exchanged between the mobile station 400 and the WAPs to derive round trip time (RTT) information.

Once measured, the RTT values may be passed to the positioning module 416 to assist in determining the position of the mobile device 400. The positioning module 416 may use supplemental information to estimate the processing times of the WAPs.

In one embodiment, the amplitude values of the signals transmitted by the WAPs may be used to provide this information. These amplitude values may be determined in the form of RSSI measurements determined by RSSI module 420. The RSSI module 420 may provide amplitude and statistical information regarding the signals to the positioning module 416. The positioning module 416 may then estimate the processing times to calibrate the RTT measurements and accurately determine position. The position may then be output to the application module 430 in response to its aforementioned request. In addition, the positioning module 416 may utilize a parameter database 424 for exchanging operational parameters. Such parameters may include the determined processing times for each WAP, the WAPs positions in a common coordinate frame, various parameters associated with the network, initial processing time estimates, and processing time estimates determined previously, etc.

Target information module 432 may determine geographical state information and permissions information provided by the positioning server 210. The permissions information determines what level of access the user device may be granted for each target device 214a-214b, which may be stored in parameter database 424 upon reception from the positioning server 210. The geographic state information for the target device 214a-214b may be provided to the rendering and display module 428, as well as the imaging sensor data from the imaging sensor 413. The rendering and display module 428 may process the geographical state information and the imaging sensor data so a visual identifier, corresponding to each target 214a-214b in the field of view of the imaging sensor 413, may be combined with the imaging sensor data for display/touchscreen 456. The visual identifier 119 may be a photograph, an icon, etc. associated with the target user that can be obtained from positioning server 210 and/or the retrieved from parameter database 424.

In other embodiments, the supplemental information may optionally include auxiliary position and/or motion data which may be determined from other sources. The auxiliary position data may be incomplete or noisy, but may be useful as another source of independent information for estimating the processing times of the WAPs. Moreover, in other embodiments, supplemental information may include, but not be limited to, information that can be derived or based upon Bluetooth signals, beacons, RFID tags, and/or information derived from map (e.g., receiving coordinates from a digital representation of a geographical map by, for example, a user interacting with a digital map). In one embodiment, all or part of the supplemental information may be derived from information supplied by motion/orientation sensor 412 and/or SPS receiver 408. In other embodiments, the supplemental information may be determined through additional networks using non-RTT techniques (e.g., AFLT within a CDMA network). In certain implementations, all or part of supplemental information may also be provided by way of motion/orientation sensor 412 and/or SPS receiver 408 without further processing by processor 410. While the modules shown in FIG. 4 are illustrated in the example as being contained in memory 414, it is recognized that in certain implementations, such procedures may be provided for or otherwise operatively arranged using other or additional mechanisms. For example, all or part of the modules shown in memory 414 may alternatively be provided in firmware and/or dedicated hardware.

Processor 410 may include any form of logic suitable for performing at least the techniques provided herein. For example, processor 410 may be operatively configurable based on instructions in memory 414 to selectively initiate one or more routines that exploit motion data for use in other portions of the mobile station 400.

The mobile station 400 may include a user interface 450 which provides any suitable interface systems, such as a microphone/speaker 452, keypad 454, and display/touchscreen 456 that allows user interaction with the mobile station 400. The microphone/speaker 452 provides for voice communication services using the wide area network transceiver 404 and/or the local area network transceiver 406. The keypad 454, which may be optional when the display 456 includes a touchscreen, comprises any suitable buttons for user input. The display/touchscreen 456 comprises any suitable display, such as, for example, a backlit LCD display, and can further include a touch screen display for additional user input modes. The display/touchscreen 456 may also be used to provide the visual identifier of the target.

As used herein, mobile station 400 may be any portable or movable device or machine that is configurable to acquire wireless signals transmitted from, and transmit wireless signals to, one or more wireless communication devices or networks. Thus, by way of example but not limitation, mobile station 400 may include a radio device, a cellular telephone device, a computing device, a personal communication system (PCS) device, or other like movable wireless communication equipped device, appliance, or machine. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

As used herein, the term "wireless device" may refer to any type of wireless communication device which may transfer information over a network and also have position determination and/or navigation functionality. The wireless device may be any cellular mobile station, personal communication system (PCS) device, personal navigation device, laptop, personal digital assistant, or any other suitable mobile device capable of receiving and processing network and/or SPS signals.

In some instances, a single device may perform the operations of a user device and a target device at the same time. For example, when a user participates in a group agreeing to be tracked, and wishes to be able to track other participants in the group, the user's mobile device may perform location determination and provide geographical state information updates to server while simultaneously allowing the user to track one or more other participants in the group.

Figure 5:
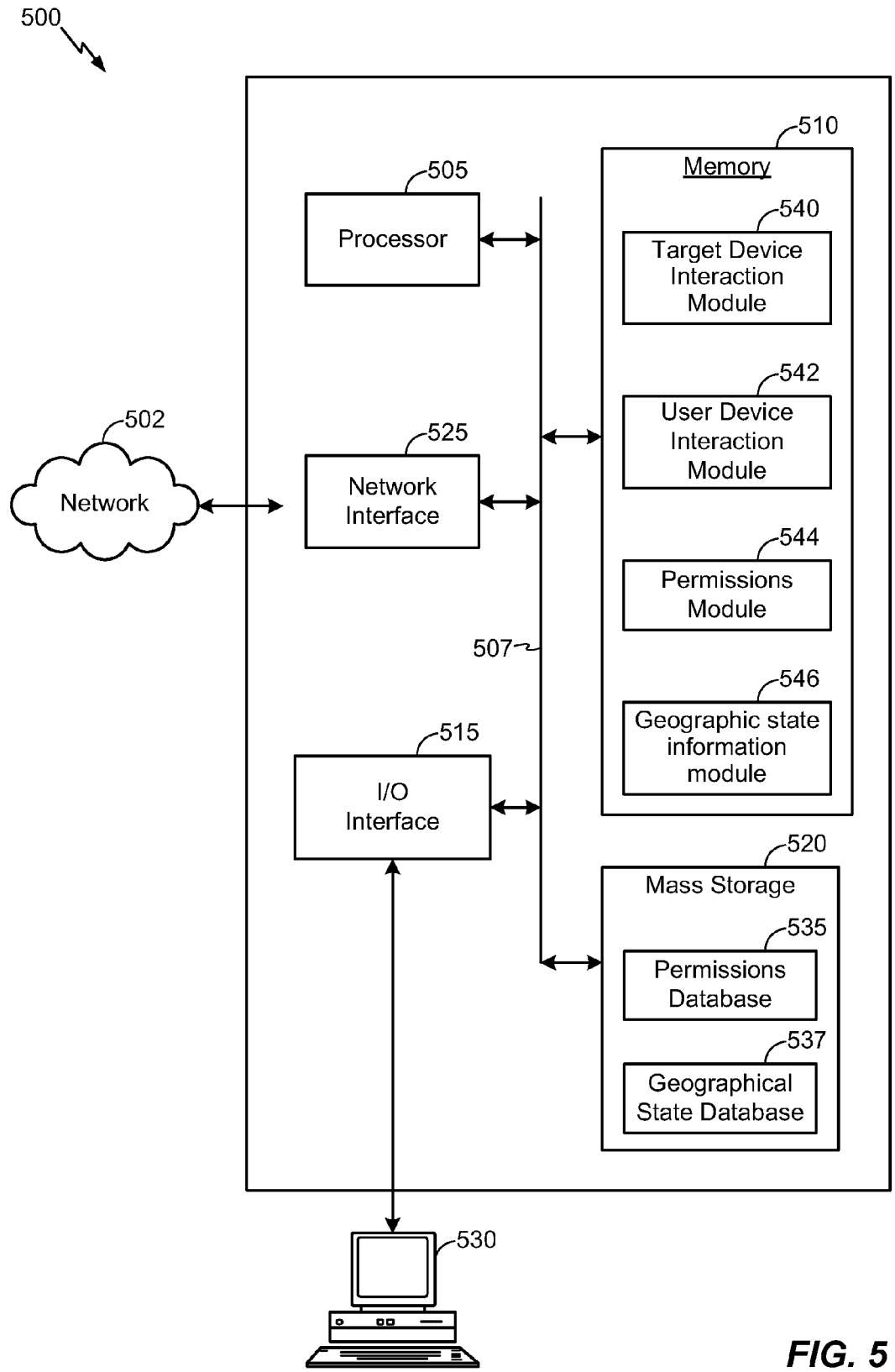
FIG. 5 is a block diagram illustrating various components of an exemplary positioning server.

FIG. 5 is a block diagram illustrating various components of an exemplary positioning server 500. The positioning server 500 may include a processor 505, a system bus 507, a mass storage unit 520, an I/O interface 515, a memory unit 510, and a network interface 525. The processor 505 may interface with memory unit 510 and the mass storage unit 520 via the system bus 507. The memory unit 510 and/or the mass storage unit 520 may contain executable instructions in the form of software modules and data in a parameter database for implementing various operations for visually identifying the location of a designated target as described herein. The network interface 525 may interface with the processor 505 over the system bus 507, and can provide an interface for communication with the network 502. The I/O interface 515 may be provided to permit a user to interface to the positioning server 500 via user interface 530. The positioning server 500 may be any type of computer/server utilizing any suitable operating system. Alternatively, the positioning server 500 may be implemented as special purpose hardware.

The software modules and data tables may reside in memory unit 510 and/or mass storage unit 520 can be utilized by the processor 505 in order to assist the mobile station 400 in visually identifying the location of a designated target. As illustrated in FIG. 5, memory unit 510 may include and/or otherwise receive a target device interaction module 540, a user device interaction module 542, and a permissions module 544. One should appreciate that the organization of the memory unit 510 contents as shown in FIG. 5 is merely exemplary, and as such the functionality of the modules and/or data structures may be combined, separated, and/or be structured in different ways depending upon the implementation of the positioning server 500.

The positioning server 500 may receive geographical state information from one or more target devices 214a-214b. This information for each target device 214a-214b may be stored in the geographical state database 537, and can be stored over any period of time so target devices 214a-214b can be tracked and/or historical data may be used to determine the persistence of a target device 214a-214b. This geographical state database 537 may contain time histories of the target devices 214a-214b position information, and thus permit tracking and derivation of other state variables as a function of time which are associated with the target devices 214a-214b. Given the ubiquitous nature of modern networks, the tracking of target devices 214a-214b may be established over any conceivable geographic range, from within a single building to a global scale, or even beyond using delay tolerant networking (DTN) techniques.

Further referring to FIG. 5, the positioning server 500 may provide the geographical state information to a user device (e.g., mobile station 208) upon request if the requesting user has the appropriate permissions for access. The permissions for each target may be stored in the permission database 535. The target device interaction module 540 may be used to determine and store the geographical state information and the permissions data for each target device 214a-214b. The positioning server 500 may receive positions and corresponding time values from each target device. These values may be processed into geographic state information in the geographic state information module 546. The user device interaction module 542 may process queries from a user device or geographical state information for a specific target device 214a-214b. Once the positioning server 500 determines the user device as the appropriate permissions for the requested target device 214a-214b, the positioning server 500 may provide the geographic state information to the user device The permissions may be determined by the permissions module 544 working in conjunction with the permissions database 535.

While the modules shown in FIG. 5 are illustrated in the example as being contained in memory unit 510, it is recognized that in certain implementations such procedures may be provided for or otherwise operatively arranged using other or additional mechanisms. For example, all or part of target device interaction module 540, user device interaction module 542, and permissions module 544 may be provided in firmware. Additionally, while the example of FIG. 5 illustrates these as being separate modules, it is recognized, for example, that such procedures may be combined together as one procedure or perhaps with other procedures, or otherwise further divided into a plurality of sub-procedures.

Figure 6:
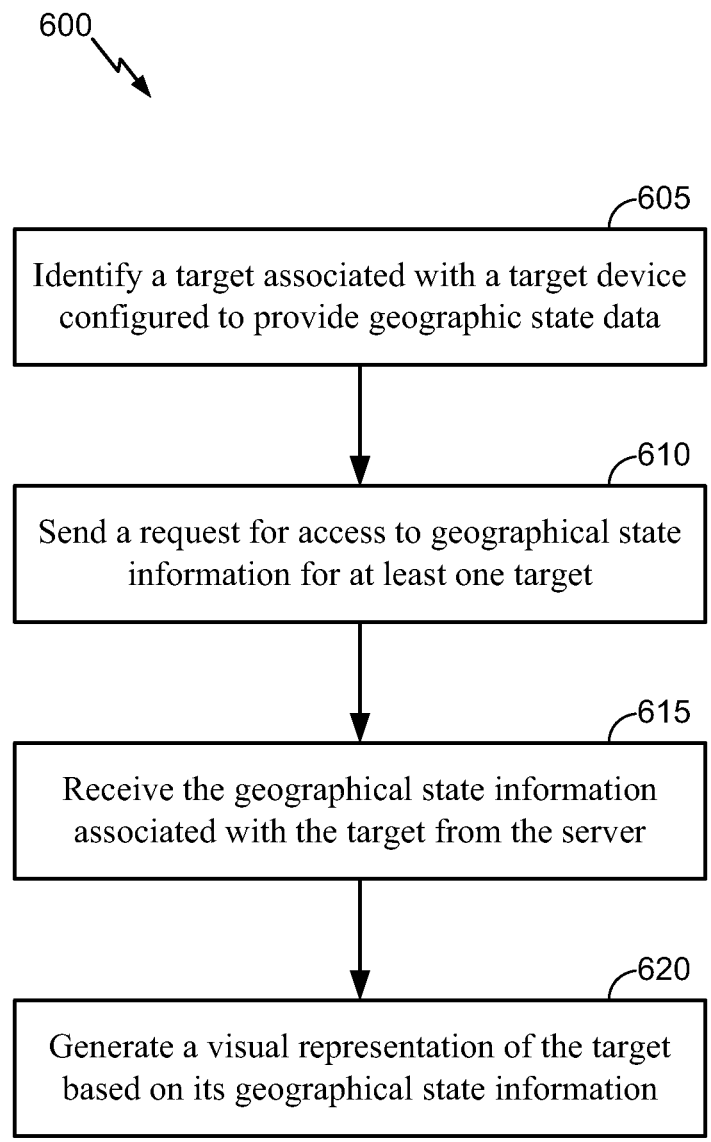
FIG. 6 is a flowchart showing an exemplary process that may be executed by a mobile station for visually identifying the location of a target.

FIG. 6 is a flowchart showing an exemplary process 600 that may be executed by the mobile station 208 (i.e., an exemplary user device) for visually identifying the location of a designated target. The process 600 may start by identifying one or more targets associated with a target device that may be configured to provide geographic state information (Block 605). The geographic state information may include positions, orientations, velocities, and/or their associated time values. That is, the position data, orientation data, etc. may be time tagged so it can be tracked as a function of time. Moreover, other information such as velocity, heading angle, etc. may be derived from the position and time tag information using known techniques. The geographical state information may be provided in a standard reference frame along with the corresponding time values. The mobile station 208 may then send a request to access the geographical state information for at least one target (Block 610). This request may be sent to positioning server 210. The mobile station 208 may then receive the geographical state information associated with one or more targets 214a-214b from the positioning server 210 (Block 615). The mobile station 208 may then generate a visual identifier of the target based on its geographical state information (Block 620). The visual identifier may be overlaid with imaging sensor data captured by the imaging sensor 413 on board the mobile station 400, and shown on display 456.

Figure 7:
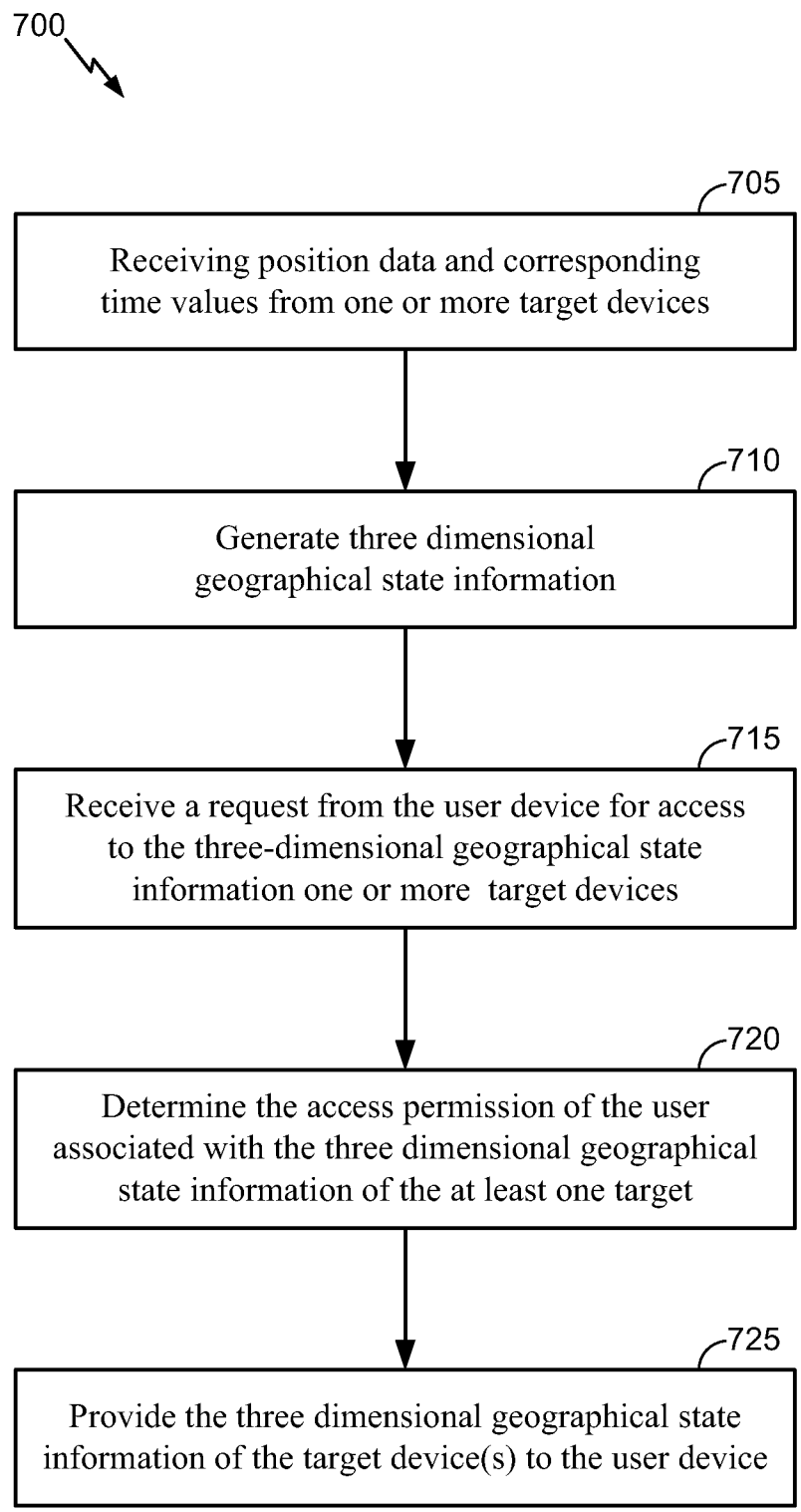
FIG. 7 is a flowchart showing an exemplary process that may be executed by a positioning server to assist in visually identifying the location of a target.

FIG. 7 is a flowchart showing an exemplary process 700 that may be executed by the positioning server 500 to assist the mobile station 400 in visually identifying the location of a designated target 106. The process 700 may start by receiving position and/or time data from one or more target devices 214a-214b (Block 705). The position data may be provided in a standard reference frame, along with corresponding time values, from the target device(s) 214a-214b. Next, the positioning server 210 may generate three-dimensional geographical state information using the position data and the corresponding time values (Block 710). Next, the positioning server 500 may receive a request from a user device for access to the three-dimensional geographical state information for at least one target 214a-214b (Block 715). The positioning server 500 may then determine access permission of the user associated with the three-dimensional geographical state information of the at least one target 214a-214b (Block 720). Based on the access permissions of the user, the positioning server 500 may then provide the three-dimensional geographical state information of the target device(s) 214a-214b based on the request to the user device 208 (Block 725). In some embodiments, the server may also periodically update the three-dimensional geographical state information to the user device (e.g., mobile station 208).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, the invention is not limited to illustrated examples, and any means for performing the functionality described herein are included in embodiments of the invention. While the foregoing disclosure shows illustrative embodiments of the invention, it should be noted that various changes and modifications could be made herein without departing from the scope of the invention as defined by the appended claims. The functions, steps, and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for determining a geographical state of a target through a user device, comprising:
   identifying at least one target associated with a target device configured to provide position data in a standard reference frame along with corresponding time values;
   sending a request for access to geographical state information for at least one target;
   receiving geographical state information associated with the at least one target; and
   generating a visual identifier of the at least one target based on the geographical state information, wherein the visual identifier indicates an age of a previous position, velocity, or orientation of the at least one target or a persistence of a present position, velocity, or orientation of the at least one target, and wherein the visual identifier is associated with data captured by an imaging sensor functionally coupled to the user device.

2. The method of claim 1, wherein the visual identifier is dynamic and changes based on the geographical state information.

3. The method of claim 1, wherein the generating the visual identifier further comprises:
   generating a visual identifier of a history of the at least one target, wherein the visual identifier comprises a plurality of visual identifiers representing a plurality of locations of the target device over a period of time.

4. The method of claim 1, further comprising:
   determining whether the at least one target is within a radius of a specified location; and
   displaying the visual identifier of the at least one target only when the at least one target is within the radius.

5. The method of claim 4, further comprising:
   setting an alert based on the geographical state information, wherein the alert comprises a text message, a pop up message, and/or an audible alert.

6. The method of claim 1, wherein the generating a visual identifier further comprises:
 collecting video data in a field of view of the imaging sensor; and
 combining the visual identifier of the at least one target with the video data based on the geographical state information.

7. The method of claim 6, wherein the video data is collected as an orientation of the user device is changed.

8. The method of claim 7, wherein the combining further comprises:
 overlaying the visual identifier of the at least one target on the video data based on the geographical state information when the at least one target is not within the field of view of the imaging sensor.

9. The method of claim 1, wherein the generating a visual identifier further comprises:
 collecting still image data in a field of view of the imaging sensor; and
 combining the visual identifier of the at least one target with the still image data based on the geographical state information.

10. The method of claim 9, wherein the still image data is collected as an orientation of the user device is changed.

11. The method of claim 10, wherein the combining further comprises:
 overlaying the visual identifier of the at least one target on the still image data based on the geographical state information when the at least one target is not within the field of view of the imaging sensor.

12. The method of claim 1, wherein the imaging sensor and the user device are physically separate and functionally coupled over a network.

13. The method of claim 1, wherein a size of the visual identifier is based on proximity to a reference.

14. The method of claim 1, further comprising:
 selecting the visual identifier of the at least one target;
 interacting with the at least one target associated with the selecting.

15. The method of claim 1, wherein the interacting comprises texting, voice calling, video conferencing, or initiating a game with the at least one target.

16. The method of claim 1, where in the at least one target is selected from a buddy list of third party members for display, and includes options to limit participants and options to display a class of third party members differently to distinguish them, or have different alerts when the third party members of the buddy list are discovered and/or displayed.

17. The method of claim 1, further comprising:
 altering an appearance of the visual identifier of the at least one target based upon time.

18. The method of claim 1, wherein the at least one target interacts with the user device through playing a game.

19. The method of claim 18, further comprising:
 playing a game of hide and go seek wherein the game of hide and seek starts with no display of targets until a predetermined time expires, a seeker can scan an area to find hidden targets, wherein hidden targets can view the seeker at all times, further wherein the seeker will display targets within a proximity, upon which users associated with displayed targets will be provided a notification as being found.

20. The method of claim 19, further comprising:
 establishing a geo-fence designating an area wherein targets cannot be found by the seeker.

21. A mobile station which generates a visual identification of a location of a target, comprising:
 a wireless transceiver;
 a processor coupled to the wireless transceiver;
 an imaging sensor functionally coupled to the processor; and
 a memory coupled to the processor, wherein the memory stores executable instructions and data for causing the processor to
  identify at least one target associated with a target device configured to provide position data in a standard reference frame along with corresponding time values,
  send a request for access to geographical state information for at least one target,
  receive geographical state information associated with the at least one target, and
  generate a visual identifier of the at least one target based on the geographical state information, wherein the visual identifier indicates an age of a previous position, velocity, or orientation of the at least one target or a persistence of a present position, velocity, or orientation of the at least one target, and wherein the visual identifier is associated with data captured by the imaging sensor.

22. The mobile station of claim 21, wherein the visual identifier is dynamic and changes based on the geographical state information.

23. The mobile station of claim 21, wherein the executable instructions and data further cause the processor to:
 generate a visual identifier of a history of the at least one target, wherein the visual identifier comprises a plurality of visual identifiers representing a plurality of locations of the target device over a period of time.

24. The mobile station of claim 21, wherein the executable instructions and data further cause the processor to:
 determine whether the at least one target is within a radius of a specified location, and
 display the visual identifier of the at least one target only when the at least one target is within the radius.

25. The mobile station of claim 24, wherein the executable instructions and data further cause the processor to:
 set an alert based on the geographical state information, wherein the alert comprises a text message, a pop up message, and/or an audible alert.

26. The mobile station of claim 21, wherein the executable instructions and data further cause the processor to:
 collect video data in a field of view of the imaging sensor; and
 combine the visual identifier of the at least one target with the video data based on the geographical state information.

27. The mobile station of claim 26, wherein the video data is collected as an orientation of the mobile station is changed.

28. The mobile station of claim 27, wherein the executable instructions and data further cause the processor to:
 overlay the visual identifier of the at least one target on the video data based on the geographical state information when the at least one target is not within the field of view of the imaging sensor.

29. The mobile station of claim 21, wherein the executable instructions and data further cause the processor to:
 collect still image data in a field of view of the imaging sensor; and
 combine the visual identifier of the at least one target with the still image data based on the geographical state information.

30. The mobile station of claim 29, wherein the still image data is collected as an orientation of the mobile station is changed.

31. The mobile station of claim 30, wherein the executable instructions and data further cause the processor to:
 overlay the visual identifier of the at least one target on the still image data based on the geographical state information when the at least one target is not within the field of view of the imaging sensor.

32. The mobile station of claim 21, wherein the imaging sensor and the mobile station are physically separate and functionally coupled over a network.

33. The mobile station of claim 21, wherein a size of the visual identifier is based on proximity to a reference.

34. The mobile station of claim 21, wherein the executable instructions and data further cause the processor to:
select the visual identifier of the at least one target;
interact with the at least one target associated with the selection of the visual identifier of the at least one target.

35. The mobile station of claim 21, wherein the executable instructions and data further cause the processor to: text, voice call, video conference, or initiate a game with the at least one target.

36. The mobile station of claim 21, where in the at least one target is selected from a buddy list of third party members for display, and includes options to limit participants and options to display a class of third party members differently to distinguish them, or have different alerts when members of the buddy list are discovered and/or displayed.

37. The mobile station of claim 21, wherein the executable instructions and data further cause the processor to:
alter an appearance of the visual identifier of the at least one target based upon time.

38. The mobile station of claim 21, wherein the at least one target interacts with the mobile station through playing a game.

39. The mobile station of claim 38, wherein the executable instructions and data further cause the processor to:
play a game of hide and go seek wherein the game starts with no display of targets until a predetermined time expires, wherein if the mobile station comprises a seeker, the mobile station can scan an area to find hidden targets, wherein hidden targets can view the seeker at all times, further wherein the seeker will display targets within a proximity, upon which users associated with displayed targets will be provided a notification as being found.

40. The mobile station of claim 39, wherein the executable instructions and data further cause the processor to:
establish a geo-fence designating an area wherein targets cannot be found by the seeker.

41. A mobile station which generates a visual identification of a location of a target, comprising:
means for identifying at least one target associated with a target device configured to provide position data in a standard reference frame along with corresponding time values;
means for sending a request for access to geographical state information for at least one target;
means for receiving geographical state information associated with the at least one target; and
means for generating a visual identifier of the at least one target based on the geographical state information, wherein the visual identifier indicates an age of a previous position, velocity, or orientation of the at least one target or a persistence of a present position, velocity, or orientation of the at least one target, and wherein the visual identifier is associated with data captured by an imaging sensor functionally coupled to the mobile station.

42. The mobile station of claim 41, wherein the visual identifier is dynamic and changes based on the geographical state information.

43. The mobile station of claim 41, further comprising:
means for generating a visual identifier of a history of the at least one target, wherein the visual identifier comprises a plurality of visual identifiers representing a plurality of locations of the target device over a period of time.

44. The mobile station of claim 41, further comprising:
means for determining whether the at least one target is within a radius of a specified location; and
means for displaying the visual identifier of the at least one target only when the at least one target is within the radius.

45. The mobile station of claim 44, further comprising:
means for setting an alert based on the geographical state information, wherein the alert comprises a text message, a pop up message, and/or an audible alert.

46. The mobile station of claim 41, further comprising:
means for collecting video data in a field of view of the imaging sensor; and
means for combining the visual identifier of the at least one target with the video data based on the geographical state information.

47. The mobile station of claim 41, further comprising:
means for collecting still image data in a field of view of the imaging sensor; and
means for combining the visual identifier of the at least one target with the still image data based on the geographical state information.

48. The mobile station of claim 41, further comprising:
means for selecting the visual identifier of the at least one target;
means for interacting with the at least one target associated with the selection of the visual identifier of the at least one target.

49. The mobile station of claim 41, where in the at least one target is selected from a buddy list of third party members for display, and includes options to limit participants and options to display a class of third party members differently to distinguish them, or have different alerts when members of the buddy list are discovered and/or displayed.

50. A non-transitory computer-readable medium comprising instructions, which, when executed by a processor, cause a computer to perform operations, the instructions comprising:
instructions to identify at least one target associated with a target device configured to provide position data in a standard reference frame along with corresponding time values;
instructions to send a request for access to geographical state information for at least one target;
instructions to receive geographical state information associated with the at least one target; and
instructions to generate a visual identifier of the at least one target based on the geographical state information, wherein the visual identifier indicates an age of a previous position, velocity, or orientation of the at least one target or a persistence of a present position, velocity, or orientation of the at least one target, and wherein the visual identifier is associated with data captured by the imaging sensor.

51. The non-transitory computer-readable medium of claim 50, wherein the visual identifier is dynamic and changes based on the geographical state information.

52. The non-transitory computer-readable medium of claim 51, wherein the instructions further comprise:
instructions to determine whether the at least one target is within a radius of a specified location, and instructions to display the visual identifier of the at least one target only when the at least one target is within the radius.

53. The non-transitory computer-readable medium of claim 52, wherein the instructions further comprise:
instructions to set an alert based on the geographical state information, wherein the alert comprises a text message, a pop up message, and/or an audible alert.

54. The non-transitory computer-readable medium of claim 50, wherein the instructions further comprise:
instructions to collect video data in a field of view of the imaging sensor; and
instructions to combine the visual identifier of the at least one target with the video data based on the geographical state information.

55. The non-transitory computer-readable medium of claim 54, wherein the instructions further comprise:
instructions to overlay the visual identifier of the at least one target on the video data based on the geographical state information when the at least one target is not within the field of view of the imaging sensor.

56. The non-transitory computer-readable medium of claim 50, wherein the instructions further comprise:
instructions to collect still image data in a field of view of the imaging sensor; and
instructions to combine the visual identifier of the at least one target with the still image data based on the geographical state information.

57. The non-transitory computer-readable medium of claim 56, wherein the instructions further comprise:
instructions to overlay the visual identifier of the at least one target on the still image data based on the geographical state information when the at least one target is not within the field of view of the imaging sensor.

58. The non-transitory computer-readable medium of claim 50, wherein the instructions further comprise:
instructions to select the visual identifier of the at least one target;
instructions to interact with the at least one target associated with the selection of the visual identifier of the at least one target.

59. The non-transitory computer-readable medium of claim 50, where in the at least one target is selected from a buddy list of third party members for display, and includes options to limit participants and options to display a class of third party members differently to distinguish them, or have different alerts when members of the buddy list are discovered and/or displayed.

60. A method for providing tracking information for a plurality of targets, comprising:
receiving position data in a standard reference frame, along with corresponding time values, from a plurality of target devices;
generating geographical state information based on the position data and the corresponding time values, wherein the geographical state information indicates an age of a previous position, velocity, or orientation of at least one target of the plurality of target devices or a persistence of a present position, velocity, or orientation of the at least one target, and;
receiving a request from a user device for access to the geographical state information for the at least one target;
determining access permission of a user associated with the geographical state information of the at least one target; and
providing the geographical state information of the at least one target to the user device based on the request, wherein the user device generates a visual identifier of the at least one target based on the geographical state information of the at least one target, the visual identifier indicating the age of the previous position, velocity, or orientation of the at least one target, or the persistence of the present position, velocity, or orientation of the at least one target.

61. The method of claim 60, wherein providing geographical state information further comprises:
periodically updating the geographical state information.

62. The method of claim 60, further comprising:
determining whether the at least one target is within a radius of a specified location.

63. The method of claim 60, wherein the geographical state information comprises the present position, the previous position, the present velocity, the previous velocity, the present orientation with respect to a reference, the previous orientation with respect to a reference, or any combination thereof, and time values associated therewith.

64. A server which provides tracking information for a plurality of targets, comprising:
a network interface;
a processor coupled to the network interface; and
a memory coupled to the processor, wherein the memory stores executable instructions and data for causing the processor to:
receive position data in a standard reference frame, along with corresponding time values, from a plurality of target devices,
generate geographical state information based on the position data and the corresponding time values, wherein the geographical state information indicates an age of a previous position, velocity, or orientation of at least one target of the plurality of target devices, or a persistence of a present position, velocity, or orientation of the at least one target,
receive a request from a user device for access to the geographical state information for the at least one target,
determine access permission of a user associated with the geographical state information of the at least one target, and
provide the geographical state information of the at least one target to the user device based on the request, wherein the user device generates a visual identifier of the at least one target based on the geographical state information of the at least one target, the visual identifier indicating the age of the previous position, velocity, or orientation of the at least one target, or the persistence of the present position, velocity, or orientation of the at least one target.

65. The server of claim 64, wherein the instructions further cause the processor to:
periodically update dimensional geographical state information.

66. The server of claim 64, wherein the instructions further cause the processor to:
determine whether the at least one target is within a radius of a specified location.

67. The server of claim 64, wherein the geographical state information comprises the present position, the previous position, the present velocity, the previous velocity, the present orientation with respect to a reference, the previous orientation with respect to a reference, or any combination thereof, and time values associated therewith.

68. A server for providing tracking information for a plurality of targets, comprising:
- means for receiving position data in a standard reference frame, along with corresponding time values, from a plurality of target devices;
- means for generating geographical state information based on the position data and the corresponding time values, wherein the geographical state information indicates an age of a previous position, velocity, or orientation of at least one target of the plurality of target devices, or a persistence of a present position, velocity, or orientation of the at least one target;
- means for receiving a request from a user device for access to the geographical state information for the at least one target;
- means for determining access permission of a user associated with the geographical state information of the at least one target; and
- means for providing the geographical state information of the at least one target to the user device based on the request,
- wherein the user device generates a visual identifier of the at least one target based on the geographical state information of the at least one target, the visual identifier indicating the age of the previous position, velocity, or orientation of the at least one target, or the persistence of the present position, velocity, or orientation of the at least one target.

69. The server of claim 68, further comprising:
- means for periodically updating the geographical state information.

70. The server of claim 68, further comprising:
- means for determining whether the at least one target is within a radius of a specified location.

71. The server of claim 68, wherein the geographical state information comprises the present position, the previous position, the present velocity, the previous velocity, the present orientation with respect to a reference, the previous orientation with respect to a reference, or any combination thereof, and time values associated therewith.

72. A non-transitory computer-readable medium comprising instructions, which, when executed by a processor, cause the computer to perform operations, the instructions comprising:
- instructions to receive position data in a standard reference frame, along with corresponding time values, from a plurality of target devices;
- instructions to generate geographical state information based on the position data and the corresponding time values, wherein the geographical state information indicates an age of a previous position, velocity, or orientation of at least one target of the plurality of target devices, or a persistence of a present position, velocity, or orientation of the at least one target;
- instructions to receive a request from a user device for access to the geographical state information for the at least one target;
- instructions to determine access permission of a user associated with the geographical state information of the at least one target; and
- instructions to provide the geographical state information of the at least one target to the user device based on the request,
- wherein the user device generates a visual identifier of the at least one target based on the geographical state information of the at least one target, the visual identifier indicating the age of the previous position, velocity, or orientation of the at least one target, or the persistence of the present position, velocity, or orientation of the at least one target.

73. The non-transitory computer-readable medium of claim 72, wherein the instructions further comprise:
- instructions to periodically update the geographical state information.

74. The non-transitory computer-readable medium of claim 72, wherein the instructions further comprise:
- instructions to determine whether the at least one target is within a radius of a specified location.

75. The non-transitory computer-readable medium of claim 72, wherein the geographical state information comprises the present position, the previous position, the present velocity, the previous velocity, the present orientation with respect to a reference, the previous orientation with respect to a reference, or any combination thereof, and time values associated therewith.

* * * * *